(12) United States Patent
Lee et al.

(10) Patent No.: US 8,570,450 B2
(45) Date of Patent: Oct. 29, 2013

(54) STEREOSCOPIC IMAGE DISPLAY DEVICE AND METHOD FOR MANUFACTURING THE SAME

(75) Inventors: Cheol-Hwan Lee, Gyeonggi-do (KR); Dae-Jung Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 281 days.

(21) Appl. No.: 13/186,830

(22) Filed: Jul. 20, 2011

(65) Prior Publication Data
US 2012/0019523 A1   Jan. 26, 2012

(30) Foreign Application Priority Data

Jul. 23, 2010 (KR) .................. 10-2010-0071513

(51) Int. Cl.
*G02F 1/1335* (2006.01)
*G02F 1/1339* (2006.01)
*G06T 15/00* (2011.01)

(52) U.S. Cl.
USPC .............................. 349/15; 349/156; 349/419

(58) Field of Classification Search
USPC ..................... 349/15, 156; 345/419
See application file for complete search history.

(56) References Cited

U.S. PATENT DOCUMENTS

| 7,187,344 | B2* | 3/2007 | Feenstra et al. | 345/6 |
| 7,821,583 | B2* | 10/2010 | Yeh et al. | 349/15 |
| 8,045,069 | B2* | 10/2011 | Ijzerman et al. | 349/15 |
| 2003/0034950 | A1 | 2/2003 | Liang et al. | |
| 2003/0048522 | A1 | 3/2003 | Liang et al. | |
| 2006/0132404 | A1 | 6/2006 | Hayes et al. | |
| 2007/0188676 | A1 | 8/2007 | Choi | |
| 2009/0046045 | A1 | 2/2009 | Ikegami | |
| 2009/0185255 | A1 | 7/2009 | Cheng | |
| 2011/0096071 | A1* | 4/2011 | Okamoto et al. | 345/419 |
| 2011/0102689 | A1* | 5/2011 | Chiu | 349/15 |

FOREIGN PATENT DOCUMENTS

| CN | 1403863 A | 3/2003 |
| CN | 1410823 A | 4/2003 |
| CN | 1742221 A | 3/2006 |
| CN | 101727783 A | 6/2010 |
| EP | 2108983 A2 | 10/2009 |
| WO | 2007/072289 A2 | 6/2007 |

OTHER PUBLICATIONS

GB Combined Search and Examination Report dated Nov. 7, 2011 for counterpart GB patent application GB 1111514.4.
Office Action issued in counterpart Chinese Patent Application No. 201110282159 dated May 29, 2013.

\* cited by examiner

*Primary Examiner* — Mike Qi
(74) *Attorney, Agent, or Firm* — Morgan, Lewis & Bockius LLP

(57) ABSTRACT

A stereoscopic image display device and a method for manufacturing the same are disclosed, in which switching between a two-dimensional image and a three-dimensional image is performed using an electro wettable material depending on whether a voltage is applied. The stereoscopic image display device comprises a display panel; a first electrode formed on one surface of the display panel; a wall formed to divide a plurality of lens areas at the boundary of the respective lens areas on the first electrode; an electro-wettable material included in the wall; a first substrate formed on the wall to face the display panel; and a second electrode formed at the center of each wall on the first substrate.

15 Claims, 4 Drawing Sheets

STEREOSCOPIC IMAGE DISPLAY DEVICE AND METHOD FOR MANUFACTURING THE SAME

This application claims the benefit of the Patent Korean Application No. 10-2010-0071513, filed on Jul. 23, 2010, which is hereby incorporated by reference as if fully set forth herein.

BACKGROUND OF THE INVENTION

1. Field of the Invention

The present invention relates to a display device, and more particularly, to a stereoscopic image display device and a method for manufacturing the same, in which switching between a two-dimensional image and a three-dimensional image is performed using an electro-wettable material depending on whether a voltage is applied.

2. Discussion of the Related Art

It is expected that services for high rate information based on a high speed information communication network will be developed from a simple type service such as 'hearing and speaking' service of a phone to a multimedia type service such as 'seeing and hearing' service based on a digital terminal, which processes text, audio, and video. Ultimately, it is expected that the simple type service will be developed to a three-dimensional stereoscopic information communication service that allows a user to stereoscopically see, feel and enjoy beyond the realm of time.

Generally, a stereoscopic image that expresses a three-dimension is obtained by the principle of stereo vision through two eyes. Since binocular parallax, i.e., the distance between two eyes is about 65 mm, the left eye and the right eye see different images from each other due to such a difference in their positions. The difference between images due to the difference in positions of two eyes will be referred to as binocular disparity. The three-dimensional stereoscopic display device allows the left eye to see an image only on the left eye and the right eye to see an image only on the right eye by using the binocular disparity.

In other words, left/right eyes see different two-dimensional images, and if the two images are transferred to the brain through the retina, the brain mixes the images with each other to reproduce depth and reality of the original three-dimensional image. This ability will generally be referred to as stereography, and if this ability is applied to a display device, the device will be referred to as a stereoscopic display device.

Meanwhile, the stereoscopic display device can be divided depending on elements that realize 3-dimension (3D). For example, a driving mode of the stereoscopic display device, which drives the stereoscopic display device to have a light path difference such as a lens by using a liquid crystal layer, will be referred to as a liquid crystal field lens mode.

Generally, a liquid crystal display device includes two electrodes facing each other, and a liquid crystal layer formed between the two electrodes, wherein liquid crystal molecules of the liquid crystal layer are driven by the electric field generated by applying a voltage to the two electrodes. The liquid crystal molecules have polarization properties and optical anisotropy. In this case, the polarization properties means that molecular arrangement is switched depending on the electric field as electric charges in the liquid crystal molecule are grouped at both sides if the liquid crystal molecule is arranged in the electric field. The optical anisotropy means that a path or polarizing state of emitting light is switched depending on an incident direction or polarizing state of incident light due to a thin and long structure of the liquid crystal molecule and the molecular arrangement.

In this case, the liquid crystal layer shows the difference in transmittance due to the voltage applied to the two electrodes and displays images by varying the difference per pixel.

Recently, a liquid crystal lens electrically driven has been developed, in which the liquid crystal layer serves as a lens by using the properties of the liquid crystal molecule.

In other words, the lens controls the path of the incident light per position by using the difference in refractive index between a material constituting the lens and the air. If the liquid crystal layer is driven by forming the electric field generated by applying a different voltage to each position of the electrodes, the incident light upon the liquid crystal layer brings different phases per position. As a result, the liquid crystal layer can control the path of the incident light like the actual lens.

Hereinafter, a general liquid crystal field lens will be described with reference to the accompanying drawings.

FIG. 1 is a sectional view illustrating an effect of the difference in light path of a general liquid crystal field lens.

The general liquid crystal field lens includes first and second substrates facing each other, and a liquid crystal layer formed between the first and second substrates.

In this case, a first electrode is formed on the first substrate at a first distance from the first substrate, and a second electrode is formed on the second substrate.

Liquid crystals are arranged depending on the electric field formed between the first electrode and the second electrode when a voltage is applied, whereby an effect similar to that of the lens can be obtained by the difference in light path caused by arrangement of the liquid crystals per region as shown in FIG. 1. In this case, as the strongest electric field is applied to the center of the first electrode, the liquid crystal lies down, whereby the shortest light path is obtained. If the liquid crystal becomes far away from the center of the first electrode, it becomes erect, whereby the light path becomes longer, and an effect like a parabolic lens is obtained.

The aforementioned liquid crystal field lens is attached to the display device, and displays a stereoscopic image depending on the voltage is applied.

In this case, the display device and the liquid crystal field lens require a process of respectively forming independent panels and bonding the panels to each other. When the panels are bonded to each other, miss-alignment between a lens area of the liquid crystal field lens and a pixel of the display device may occur. This means that three-dimensional display cannot be performed normally.

Also, as the liquid crystal field lens and the display device are independently provided, they require at least two glass substrates, respectively. In order to obtain a stereoscopic image display device, at least four glass substrates are required. For this reason, problems occur in that it is difficult to obtain a slim device and the cost and process steps are increased.

As described above, the aforementioned stereoscopic image display device according to the related art has the following problems.

The stereoscopic image display device based on a liquid crystal field lens is obtained by filling a liquid crystal layer between upper and lower substrates of a display device at a certain thickness and attaching the liquid crystal filed lens, which serves as a lens depending on that a voltage is applied, thereto.

In this case, at least four glass substrates are required, whereby the cost and thickness are increased. Also, in case of the liquid crystal field lens, the liquid crystal layer requires a thickness more than the height of the desired lens, whereby a long time is required to form the liquid crystal layer having the thickness and the liquid crystal may not be filled fully. Also, misalignment may occur in the bonding process of the liquid crystal field lens and the display device. Accordingly, it is required that the aforementioned stereoscopic image display device should be formed at a different structure to have a slim size.

As the case may be, in addition to the liquid crystal field lens, a lenticular lens sheet may be attached to the display device. In this case, problems occur in that misalignment may occur between the lenticular lens sheet and the display device and image switching between a two-dimensional image and a three-dimensional image cannot be performed.

SUMMARY OF THE INVENTION

Accordingly, the present invention is directed to a stereoscopic image display device and a method for manufacturing the same, which substantially obviate one or more problems due to limitations and disadvantages of the related art.

An object of the present invention is to provide a stereoscopic image display device and a method for manufacturing the same, in which switching between a two-dimensional image and a three-dimensional image is performed using an electro wettable material depending on whether a voltage is applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device comprises a display panel; a first electrode formed on one surface of the display panel; a wall formed to divide a plurality of lens areas at the boundary of the respective lens areas on the first electrode; an electro-wettable material included in the wall; a first substrate formed on the wall to face the display panel; and a second electrode formed at the center of each wall on the first substrate.

The first and second electrodes are transparent electrodes.

Preferably, the first electrode is formed on the entire of one surface of the display panel.

The electro-wettable material is a hydrophilic material, and the wall is a hydrophobic insulating material. In this case, the stereoscopic image display device further comprises a power source allowing vertical field between the first and second electrodes to be greater than surface intension between the wall and the electro-wettable material.

The electro-wettable material has a lens pattern per lens area when different voltages are applied to the first and second electrodes through the power source.

The display panel is any one of a liquid crystal panel, an organic light-emitting display panel, an electrophoresis display panel, a plasma display panel, a field emission display panel, and a quantum dot display panel.

Also, the electro-wettable material is formed to fill a part of a space in the wall.

As the case may be, the stereoscopic image display device further comprises a hydrophobic fluid in the wall in addition to the electro-wettable material.

The display panel includes second and third substrates facing each other, a liquid crystal layer filled between the second substrate and the third substrate, a thin film transistor array formed in the second substrate, and a color filter array formed on the third substrate.

The stereoscopic image display device further comprises a first polarizer and a second polarizer respectively formed on other surface of the display panel and a surface of the first substrate.

In another aspect of the present invention, a method for manufacturing a stereoscopic image display device comprises preparing a display panel; forming a first electrode on one surface of the display panel; forming a wall of a certain height to divide a plurality of lens areas at the boundary of the respective lens areas on the first electrode; forming an electro-wettable material in the wall; and bonding a first substrate onto the wall to face the display panel, the first substrate including a second electrode to correspond to the center of each wall.

The method further comprises connecting a power source, which allows vertical field between the first and second electrodes to be greater than surface intension between the wall and the electro-wettable material, with the first and second electrodes.

The aforementioned stereoscopic image display device and the method for manufacturing the same according to the present invention have the following advantages.

First of all, a switchable lens can be formed using a property of an electro-wettable material flowing by the electric field. In this case, since a direct lens pattern can be obtained physically by flow the electro-wettable material when a voltage is applied, the lens effect can be obtained more preferably, whereby optical efficiency can be increased.

Second, the first electrode of the electro-wettable panel is formed on one surface of the display panel to share one panel of the electro-wettable panel with the display panel. In this case, the panel can be reduced, and the bonding process between the display panel and the electro-wettable panel can be omitted, whereby the material can be saved and the process steps can be reduced.

Third, since the panel that occupies the greatest weight and thickness in the display device can be reduced, the slim display device can be obtained and the weight of the display device can be reduced.

Fourth, the electro-wettable panel and the display panel can be formed by subsequent process steps not separate process steps, separate process lines are not required, and the existing process line of the display panel can be used, whereby the production cost of the device and the process time can be reduced.

Finally, if the liquid crystal panel is used as the display panel for stereoscopic display and the liquid crystal field lens is attached onto the liquid crystal panel, a polarizer is required above and below the liquid crystal panel. In this case, the polarizer between the liquid crystal panel and the liquid crystal field lens cannot be moved. If the polarizer is moved to the upper side of the liquid crystal field lens, it may prevent the liquid crystals from being arranged in the liquid crystal field lens, whereby the actual lens function may not be performed. Accordingly, if stereoscopic display is performed by the liquid crystal field lens, the panel cannot be omitted. The stereoscopic image display device of the present invention allows the upper substrate of the liquid crystal panel to share with the substrate of the switchable lens by forming the switchable lens for stereoscopic display using the electro-wettable material which is not affected by a transmission axis of the polarizer. As a result, one substrate can be omitted. Also, the rear electrode, which is formed on the surface of the liquid crystal panel to prevent static electricity from occurring, is used as the first electrode of the switchable lens, whereby electrode formation can be minimized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a stereoscopic image display device and a method for manufacturing the same according to the present invention will be described with reference to the accompanying drawings.

Figure 1:
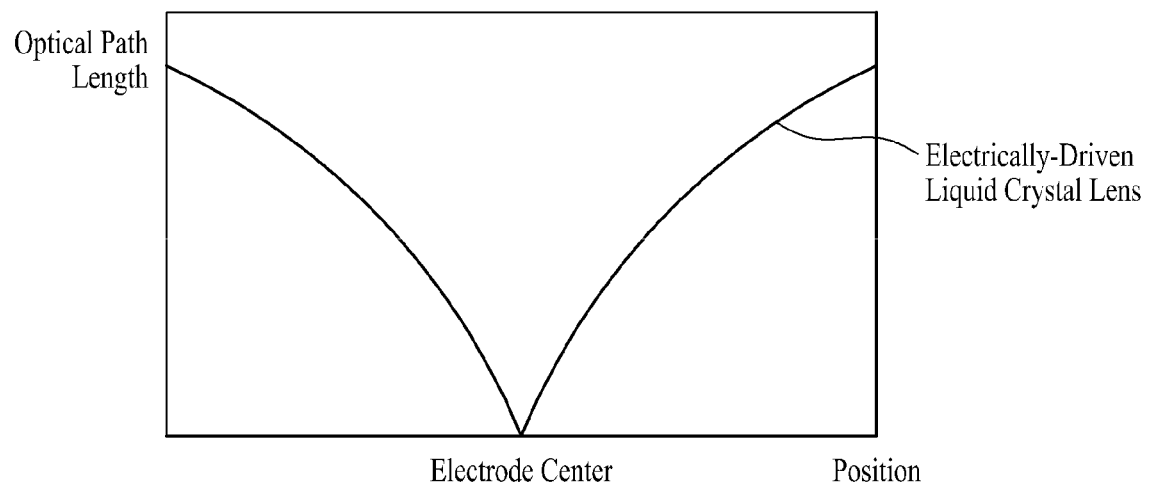
FIG. 1 is a sectional view illustrating an effect of the difference in light path of a general liquid crystal field lens.
Figure 2:
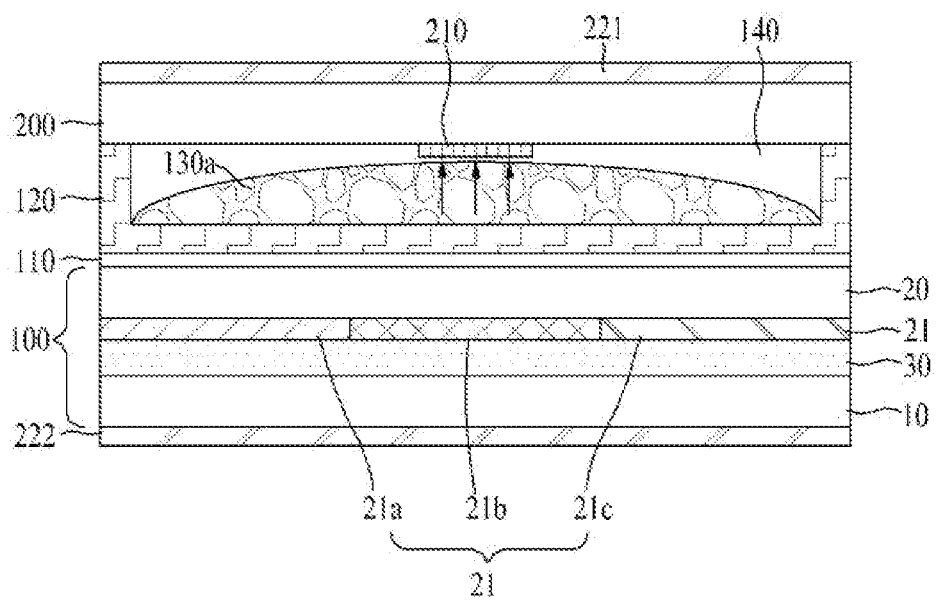
FIG. 2 is a sectional view illustrating a stereoscopic image display device according to the present invention.

FIG. 2 is a sectional view illustrating a stereoscopic image display device according to the present invention.

As shown in FIG. 2, the stereoscopic image display device according to the present invention includes a display panel 100, a first electrode 110 formed on one surface of the display panel 100, a wall 120 formed at the boundary between respective lens areas formed on the first electrode 110, an electro-wettable material 130a included in the wall 120, a first substrate 200 formed on the wall 120 to face the display panel 100, and a second electrode 210 formed at the center of the wall on the first substrate 200.

In this case, the first electrode 110 and the second electrode 210 are transparent electrodes.

The first electrode 110 is formed on one surface of the display panel 100, and the second electrode 210 is formed at the center of each lens area. The second electrode 210 can be varied depending on a lens pattern to be formed. If the wall is formed in a lattice pattern, the lens area is defined in a lattice pattern within the wall. In this case, the second electrode 210 may be arranged at the center only of the lattice pattern, or may be formed longitudinally with a longitudinal axis in one direction by passing the center. If the lens area is formed longitudinally in one direction, the second electrode 210 may be formed longitudinally in a length direction of the lens area to pass the center of the lens area. In this case, the section shown in FIG. 2 is cut to cross the length direction of the lens area.

The first substrate 200 is arranged on the wall 120, and a sealant (not shown) is provided outside the first substrate 100 to prevent the electro-wettable material 130a from flowing out, whereby the first substrate 100 can be sealed. The wall 120 of the outside may serve as a sealant as the case may be.

In this case, the electro-wettable material 130a is a hydrophilic material, and is flown by the electric field.

The wall 120 is a hydrophobic insulating material.

FIG. 2 illustrates that a voltage is applied to the first electrode 110 and the second electrode 210. As attraction occurs between the electro-wettable material 130a and the second electrode 210 due to the vertical electric field generated between the first and second electrodes 110 and 210, the electro-wettable material 130a flows in a parabolic lens pattern.

Electro-wettable phenomenon of the electro-wettable material 130a means that a fluid migrates or deforms as interfacial tension of the fluid is varied by the electric field.

In order to generate the electro-wettable phenomenon, a power source (not shown) is further provided so that the vertical electric field between the first electrode 110 and the second electrode 210 is greater than surface tension between the wall 120 and the electro-wettable material 130a. The power source grounds the first electrode 110 and applies a voltage of alternating current squarewave having a maximum value of a phase voltage or constant level to the second electrode 210.

As a result, the electro-wettable material is deformed to a lens pattern for each of the lens areas when different voltages are applied to the first electrode 110 and the second electrode 210 through the power source.

The state shown in FIG. 2 is that the voltage is applied to the first and second electrodes 110 and 210, and maintains that the electro-wettable material 130 is wieldy spread within the wall 120 due to surface tension between the wall 120 and the electro-wettable material 130 (see FIG. 3E) when no voltage is applied to the first and second electrodes 110 and 210.

The hydrophilic electro-wettable material 130a is formed to be lower than the wall 120, whereby it can flow depending on whether the voltage is applied to the first and second electrodes 110 and 210 or not.

The other space 140 of the wall 120, which is not filled with the electro-wettable material 130a, may be maintained at a vacuum state or a pressure lower than the atmospheric pressure vacuum, or may further include a hydrophobic fluid as the case may be. In this case, the hydrophilic electro-wettable material 130a is deformed to have a lens pattern depending on the electric field formed when the voltage is applied, whereby the hydrophobic fluid moves. In this case, the electric field having predetermined strength is formed in the lens area to correspond to each lens area when the voltage is applied, and interfacial tension of the hydrophilic electro-wettable material 130a is varied depending on the strength of the electric field, whereby the electro-wettable material 130a moves.

In this case, the first electrode 110, the wall 120, the electro-wettable material 130a, the first substrate 200 and the second electrode 210 have a structure of an electro-wettable display device, and have the same structure in a unit of the aforementioned lens area.

The lens area is arranged to correspond to 2 pixels or more of the lower display panel 100.

Meanwhile, the display panel 100 may be any one of a liquid crystal panel, an organic light-emitting display panel, an electrophoresis display panel, a plasma display panel, a field emission display panel, and a quantum dot display panel.

For example, the display panel 100 is the liquid crystal panel in the drawings. At this time, the display panel 100 includes second and third substrates 10 and 20 facing each other, a liquid crystal layer 30 filled between the second and third substrates 10 and 20, a thin film transistor array (not shown) formed in the second substrate 10, and a color filter array formed on the third substrate 20.

The thin film transistor array includes gate and data lines formed to cross each other, a thin film transistor formed at a crossing portion of the gate and data lines, and a pixel electrode connected with the thin film transistor and formed in each pixel region.

The color filter array, as shown, may further include a color filter layer 21, which includes color filters 21a, 21b and 21c of different colors, and a black matrix layer (not shown) formed at the boundary of the pixel regions.

If the liquid crystal panel is used as the display panel, it may further include a first polarizer 222 and a second polarizer 221, which are respectively formed on a lower surface of the second substrate 10 and an upper surface of the first substrate 200, to selectively transmit the light transmitting the liquid crystal layer 30.

In this case, the second polarizer 221 can be moved to the upper surface of the first substrate 200 as the electro-wettable material 130a formed in one pattern is not affected by a transmission axis of the second polarizer 221 when the voltage is applied. If the liquid crystal field lens, which includes a liquid crystal layer having one of molecules, which is arranged differently from the other molecules when a voltage is applied, and the liquid crystal molecule arranged differently from the other molecules may be covered when the polarizer is located on the liquid crystal field lens. For this reason, a problem occurs in that the liquid crystal lens effect cannot be obtained normally.

On the other hand, the stereoscopic image display device according to the present invention allows sharing the third substrate 20 of the liquid crystal panel with the substrate where the first electrode 110 of the switchable lens is formed using the electro-wettable material, whereby one substrate may be omitted.

Also, in order to prevent from static electricity from occurring in the liquid crystal panel, the rear electrode formed on the entire upper surface of the third substrate 20 is used as the first electrode 110 of the switchable lens, whereby electrode formation can be minimized.

The aforementioned stereoscopic image display device of the present invention can form the switchable lens using the property of the electro-wettable material 130a moved by the electric field. Accordingly, a two-dimensional image is displayed from the lower display panel 100 when no voltage is applied while a direct lens pattern can be obtained physically by movement of the electro-wettable material 130a when the voltage is applied. As a result, more desirable lens effect than the liquid crystal filed lens with a crosstalk area can be obtained using the difference in light path, whereby optical efficiency can be increased.

Also, the first electrode of the electro-wettable panel is formed on one surface of the display panel to share one substrate of the electro-wettable panel with the display panel. In this case, the substrate can be reduced, and the bonding process between the display panel and the electro-wettable panel can be omitted, whereby the material can be saved and the process steps can be reduced.

Since the substrate that occupies the greatest weight and thickness in the stereoscopic image display device can be reduced, the slim stereoscopic image display device can be obtained and its weight can be reduced.

Hereinafter, a method for manufacturing a stereoscopic image display device according to the present invention will be described.

FIG. 3A to FIG. 3E are sectional views illustrating process steps of a method for manufacturing a stereoscopic image display device according to the present invention.

Figure 3A:
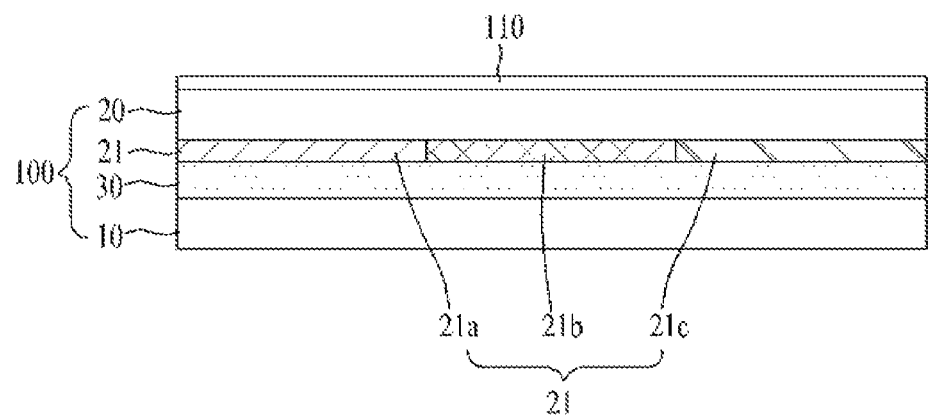
FIG. 3A to FIG. 3E are sectional views illustrating process steps of a method for manufacturing a stereoscopic image display device according to the present invention.

As shown in FIG. 3A, according to the method for manufacturing a stereoscopic image display device of the present invention, first of all, a display panel 100 is prepared.

The display panel 100 includes first and second substrates 10 and 20 facing each other, and a liquid crystal layer 30 filled between the first and second substrates 10 and 20. A liquid crystal panel is respectively provided on an inner surface of the first substrate 10 and an inner surface of the second substrate 20. The liquid crystal panel includes a thin film transistor array and a color filter array (including color filter layer 21). The display panel 100 is not limited to the liquid crystal panel, but may be any one of an organic light-emitting display panel that can be implemented as a flat panel on process steps, an electrophoresis display panel, a plasma display panel, a field emission display panel, and a quantum dot display panel.

Subsequently, a first electrode 110 is formed on the entire of one surface (upper surface) of the display panel 100.

Figure 3B:
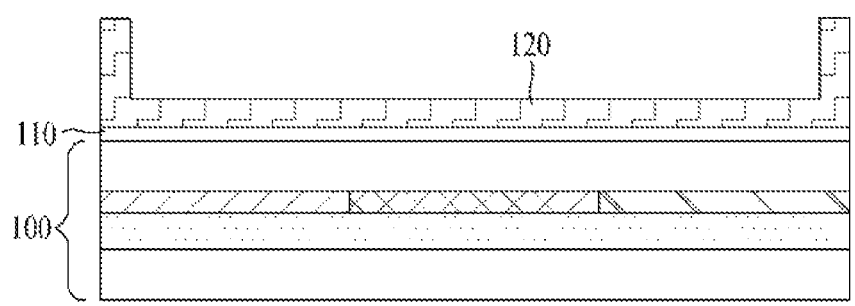

As shown in FIG. 3B, a plurality of lens areas are provided on the first electrode 110, and a wall 120 of a certain height is formed at the boundary of the respective lens areas. The wall 120 is formed by any one of an imprinting process, a printing process, a photo process, and a slit coating process. Preferably, the wall 120 is a hydrophobic material in its surface property. Also, if the wall 120 is either a material exposed and patterned by light or a material hardened by light, its component is preferably a photosensitive material.

Figure 3C:
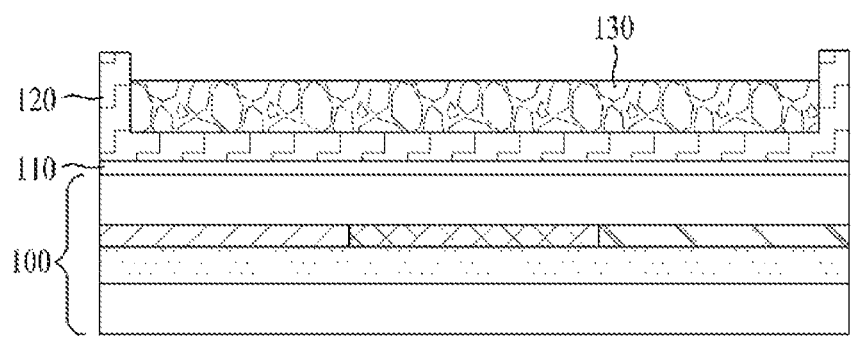

As shown in FIG. 3C, a hydrophilic electro-wettable material 130 is formed in the wall 120. At this time, the electro-wettable material 130 is doped uniformly in the wall 120 without being biased in a specific area.

Figure 3D:
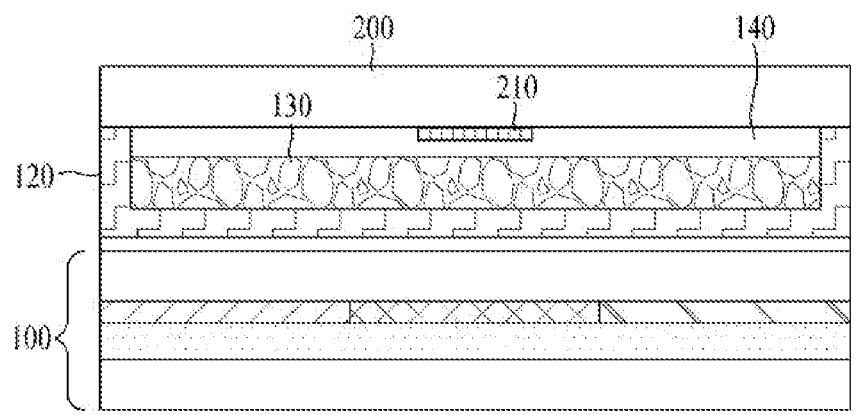
Figure 3E:
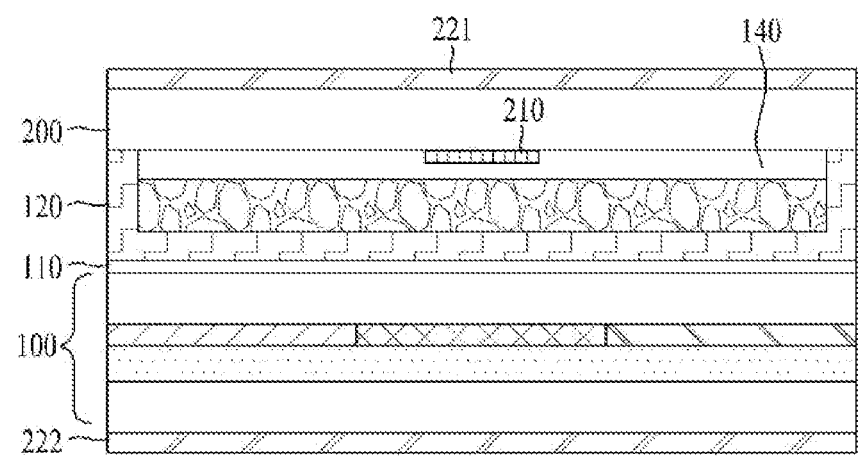

Subsequently, as shown in FIG. 3D, after a first substrate 200, which includes a second electrode 210 to correspond to the center of each wall 120, is prepared, the second electrode 210 is arranged to face the display panel 100, and the second substrate 200 is bonded onto the wall 120.

At this time, the bonding process is performed by a vacuum bonding process, whereby the hydrophilic electro-wettable material 130 is widely distributed into the surface of the wall 120 in a vacuum. Before the second substrate 200 is bonded to the wall 120, in addition to the hydrophilic electro-wettable material 120, a hydrophobic fluid may further be filled in the wall 120. In this case, the hydrophobic fluid is pushed by movement of the hydrophilic electro-wettable material when the voltage is applied, and the hydrophilic electro-wettable material may form a parabolic lens when the same electric field is formed, as described above.

Afterwards, a first polarizer 222 and a second polarizer 221 are formed respectively on a lower surface of the display panel 100 and an upper surface of the second substrate 200. If the display panel 100 is not a liquid crystal panel, the first and second polarizers 222 and 221 may be omitted.

The vertical field between the first and second electrodes 110 and 210 can connect a power source greater than surface intension between the wall and the electro-wettable material with the first and second electrodes 110 and 210. In this case, although not shown, a pad portion may respectively be defined at one ends of the first and second electrodes 110 and 210 to connect with the power source. The pad portion is defined outside the second substrate 200 or the display panel 100.

According to the aforementioned method for manufacturing a stereoscopic image display device of the present invention, the electro-wettable panel and the display panel are not formed by separate process steps but formed by subsequent process steps in such a manner that the switchable electro-wettable display panel is formed after the display panel is formed. Accordingly, separate process lines are not required, and the existing process line of the display panel can be used, whereby the production cost of the device and the process time can be reduced.

Figure 4:
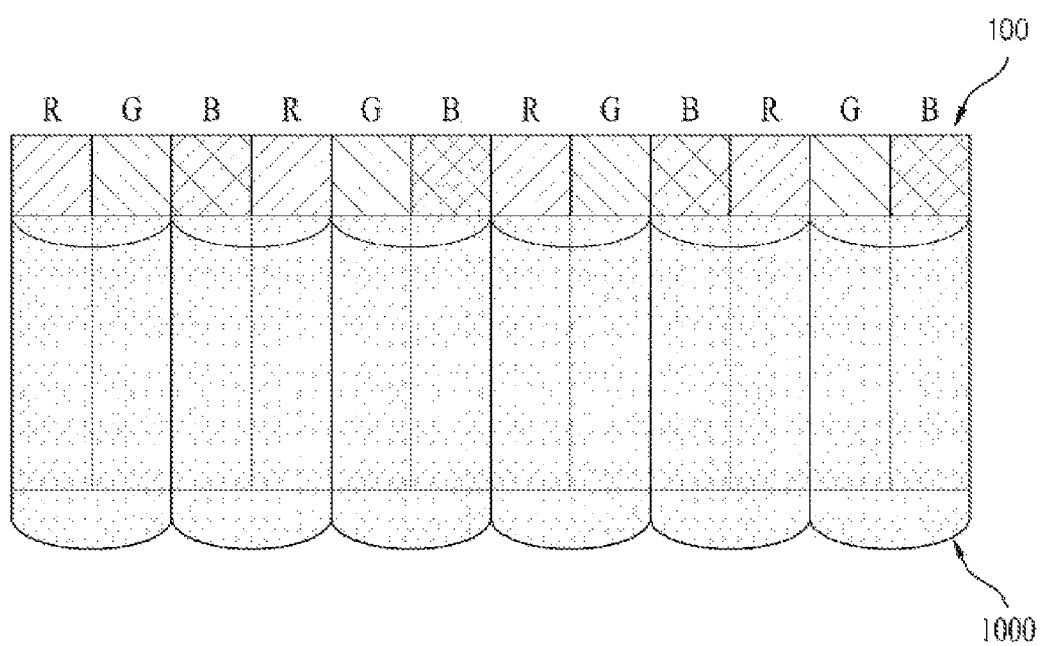
FIG. 4 is a diagram illustrating a stereoscopic effect of a stereoscopic image display device according to the present invention.

FIG. 4 is a diagram illustrating a stereoscopic effect of a stereoscopic image display device according to the present invention.

As shown in FIG. 4, according to the stereoscopic image display device of the present invention, an electro-wettable display panel 100 is further formed on a display panel 100, which includes R, G, B sub-pixels, to have a lens function. Since the upper substrate (third substrate) of the display panel 100 is shared with one substrate of the electro-wettable display panel 100 in the same manner as FIG. 2, one glass substrate can be reduced.

Also, as the glass substrate is reduced, the weight and thickness of the stereoscopic image display device can be reduced.

As shown in FIG. 4, as the voltage is applied to the electro-wettable display panel 100, one lens area may be formed to correspond to two pixels of the lower display panel 100, or one lens area may be formed to correspond to three or more pixels. The number of views can be set to corresponds to users and viewing position, whereby the number of sub-pixels corresponding to one lens area can be designated.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
a display panel;
a first electrode formed on one surface of the display panel;
a plurality of walls formed to divide a plurality of lens areas at the boundaries of the respective lens areas on the first electrode;
an electro-wettable material in the plurality of walls;
a first substrate formed on each wall to face the display panel; and
a second electrode formed at the center of each wall on the first substrate.

2. The stereoscopic image display device of claim 1, wherein the first and second electrodes are transparent electrodes.

3. The stereoscopic image display device of claim 2, wherein the first electrode is formed on the entire of one surface of the display panel.

4. The stereoscopic image display device of claim 1, wherein the electro-wettable material is a hydrophilic material, and each wall is a hydrophobic insulating material.

5. The stereoscopic image display device of claim 4, further comprising a power source allowing vertical field between the first and second electrodes to be greater than surface intension between each wall and the electro-wettable material.

6. The stereoscopic image display device of claim 5, wherein the electro-wettable material has a lens pattern per lens area when different voltages are applied to the first and second electrodes through the power source.

7. The stereoscopic image display device of claim 1, wherein the display panel is any one of a liquid crystal panel, an organic light-emitting display panel, an electrophoresis display panel, a plasma display panel, a field emission display panel, and a quantum dot display panel.

8. The stereoscopic image display device of claim 1, wherein the electro-wettable material is formed to fill a part of a space in each wall.

9. The stereoscopic image display device of claim 8, further comprising a hydrophobic fluid in each wall in addition to the electro-wettable material.

10. The stereoscopic image display device of claim 1, wherein the display panel includes second and third substrates facing each other, a liquid crystal layer filled between the second substrate and the third substrate, a thin film transistor array formed in the second substrate, and a color filter array formed on the third substrate.

11. The stereoscopic image display device of claim 1, further comprising a first polarizer and a second polarizer respectively formed on other surface of the display panel and a surface of the first substrate.

12. A method for manufacturing a stereoscopic image display device, the method comprising:
preparing a display panel;
forming a first electrode on one surface of the display panel;
forming a plurality of walls of a certain height to divide a plurality of lens areas at the boundaries of the respective lens areas on the first electrode;
forming an electro-wettable material in the plurality of walls; and
bonding a first substrate onto each wall to face the display panel, the first substrate including a second electrode to correspond to the center of each wall.

13. The method of claim 12, wherein the first and second electrodes are formed of transparent electrodes.

14. The method of claim 12, wherein the electro-wettable material is a hydrophilic material, and each wall is a hydrophobic insulating material.

15. The method of claim 14, further comprising connecting a power source, which allows vertical field between the first and second electrodes to be greater than surface intension between each wall and the electro-wettable material, with the first and second electrodes.

* * * * *